United States Patent [19]

Spooner et al.

[11] Patent Number: 4,545,447
[45] Date of Patent: Oct. 8, 1985

[54] APPARATUS FOR STACKING AND WEIGHING SLICED FOOD PRODUCTS

[75] Inventors: Robert J. Spooner; Oscar W. Dillon, both of Essex, Conn.

[73] Assignee: Cashin Systems Corp., Hauppauge, N.Y.

[21] Appl. No.: 92,195

[22] Filed: Nov. 6, 1979

Related U.S. Application Data

[63] Continuation-in-part of Ser. No. 849,528, Nov. 7, 1977, abandoned.

[51] Int. Cl.[4] ............................................. G01G 13/14
[52] U.S. Cl. ......................................... 177/165; 83/77; 83/367; 177/50
[58] Field of Search ...................... 83/77, 73, 367, 358; 177/165, 164, 121, 120, 50

[56] References Cited

U.S. PATENT DOCUMENTS

| | | | |
|---|---|---|---|
| 2,974,518 | 3/1961 | Jones | 73/1 B |
| 3,010,499 | 11/1961 | Dahms | 177/121 |
| 3,605,837 | 9/1971 | Lambert | 177/164 X |
| 3,656,337 | 4/1972 | McDonald | 73/1 B |
| 3,905,259 | 9/1975 | Spooner | 83/77 |
| 3,976,150 | 8/1976 | Wilson | 73/1 B X |
| 3,995,517 | 12/1976 | Smith | 83/77 X |

Primary Examiner—Joseph W. Hartary
Attorney, Agent, or Firm—Kane, Dalsimer, Kane, Sullivan and Kurucz

[57] ABSTRACT

Apparatus is provided for stacking and weighing slices of cold-cuts coming from the discharge end of a slicing machine. The apparatus is initially set to receive slices in stacked form on a stacker. A scale is positioned with respect to the stacker to register the weight after a preselected amount of slices are collected on the stacker. A tare correction control system and a profile compensation control system are provided to assist in maintaining more uniform weight with fewer rejected stacks. The tare correction system is utilized to automatically reset the scale between weighings to compensate for build-up of scrap materials on the weight conveyor. The profile compensation control system is provided to compensate for tapers on the rear and front ends of a load to be sliced and accordingly adjust the slice thickness and obtain uniform and acceptable stack weights.

10 Claims, 5 Drawing Figures

FIG. 1
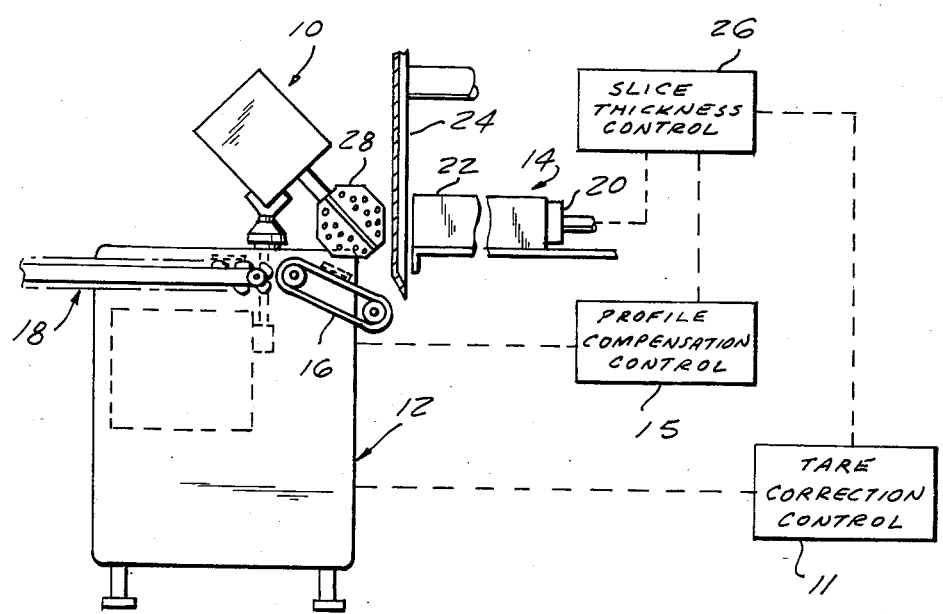
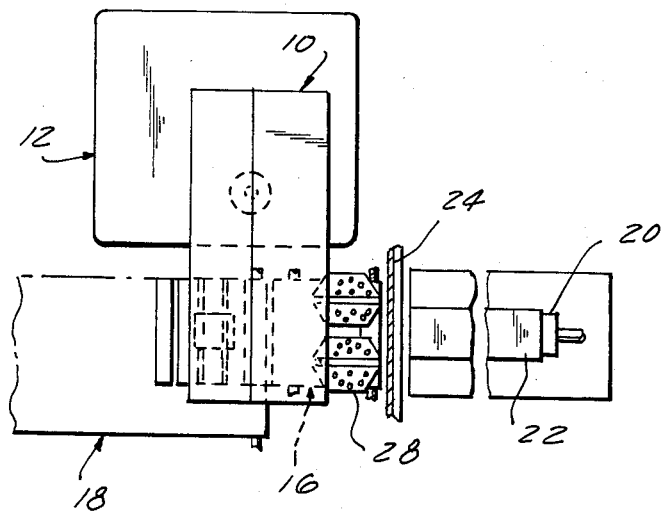
FIG. 2

APPARATUS FOR STACKING AND WEIGHING SLICED FOOD PRODUCTS

CROSS REFERENCE TO RELATED APPLICATION

This is a continuation-in-part application of copending application Ser. No. 849,528 filed Nov. 7, 1977, now abandoned, the disclosure of which is incorporated herein by reference.

BACKGROUND OF THE INVENTION

The present application relates to improvements and apparatus for slicing food products and arranging them in stack form of controlled weight; apparatus of this type is disclosed in commonly assigned U.S. Pat. Nos. 2,903,032, granted Sept. 9, 1959, 3,099,304, granted July 30, 1963, 3,200,864, granted Aug. 17, 1965, 3,204,676, granted Sept. 7, 1965, 3,835,742, granted Sept. 17, 1974, 3,846,957, granted Nov. 12, 1974, 3,846,958, granted Nov. 12, 1974, 3,880,035, granted Apr. 29, 1975, 3,905,259, granted Sept. 16, 1975, 3,906,823, granted Sept. 23, 1975 and 3,910,141, granted Oct. 7, 1975. While apparatus of the type disclosed in these patents have proven to be eminently satisfactory, it is desirable to upgrade their operation and efficiency in an effort to further reduce give away weights of product being sliced and the time of attendant personnel required to make proper weights of those stacks not within the prescribed weight tolerances.

SUMMARY OF THE INVENTION

Accordingly, it is a principal object of the present invention to provide an improved apparatus for stacking and weighing slices of food product that is highly efficient with reduced give away weights and labor costs.

It is an objective to provide an automatic tare correction control system and a profile compensation control system to help in maintaining more uniform weights with fewer rejected stacks. It is an objective to provide a tare correction system which operates automatically by dropping a weight on the scale each time the carriage is in the return cycle. While the carriage is returning, the scale will reset itself. The point to where it resets depends upon a comparison of the weight on the scale and a predetermined control weight setting. In this manner, build-up of meat scraps or grease on the weight head conveyor does not affect the weight of the stack, since this is taken into account on each return cycle and correction is made.

The profile compensation control system is provided for adjustment of the machine to accommodate the common tapers on the front and back end of the loaf. In this manner the operator can maintain better weights with fewer rejects when slicing at the front and back end of the loaf. All loaves, round or square have some degree of taper, both front and rear. Known automatic error signal systems cannot anticipate this change in the diameter of the product. While slicing the front portion of the loaf, the automatic signal will correct to make the slice heavier. Slicing up the taper to the proper diameter increases weight by itself, and the resultant weight pattern would provide for one or two rejects than one or two accepts and then one or two rejects again as the weight passes from light to correct to heavy. Thereafter, the weight pattern settles down through the center of the loaf given correct weights until the rear taper of the loaf is reached. At that point the automatic error signal system senses the stacks becoming lighter due to decrease in diameter of the loaf, however, often the automatic error signal system provided does not have the ability to give sufficient correction to overcome this downward taper which will result in several light weight stacks. It is an objective to provide a taper correction system to minimize these front rear problems and provide more consistent weights throughout the loaf and fewer rejects.

Other objects and advantages will become apparent from the following detailed description which is to be taken in conjunction with the accompanying drawings.

BRIEF DESCRIPTION OF THE DRAWINGS

In The Drawings:

FIG. 1 is a fragmentary side elevational view of the apparatus of the present invention for stacking and weighing sliced food products coming from a slicing machine and transferring the stacks of desired weight to a packaging station;

FIG. 2 is a top plan view thereof;

DETAILED DESCRIPTION

Figure 3:
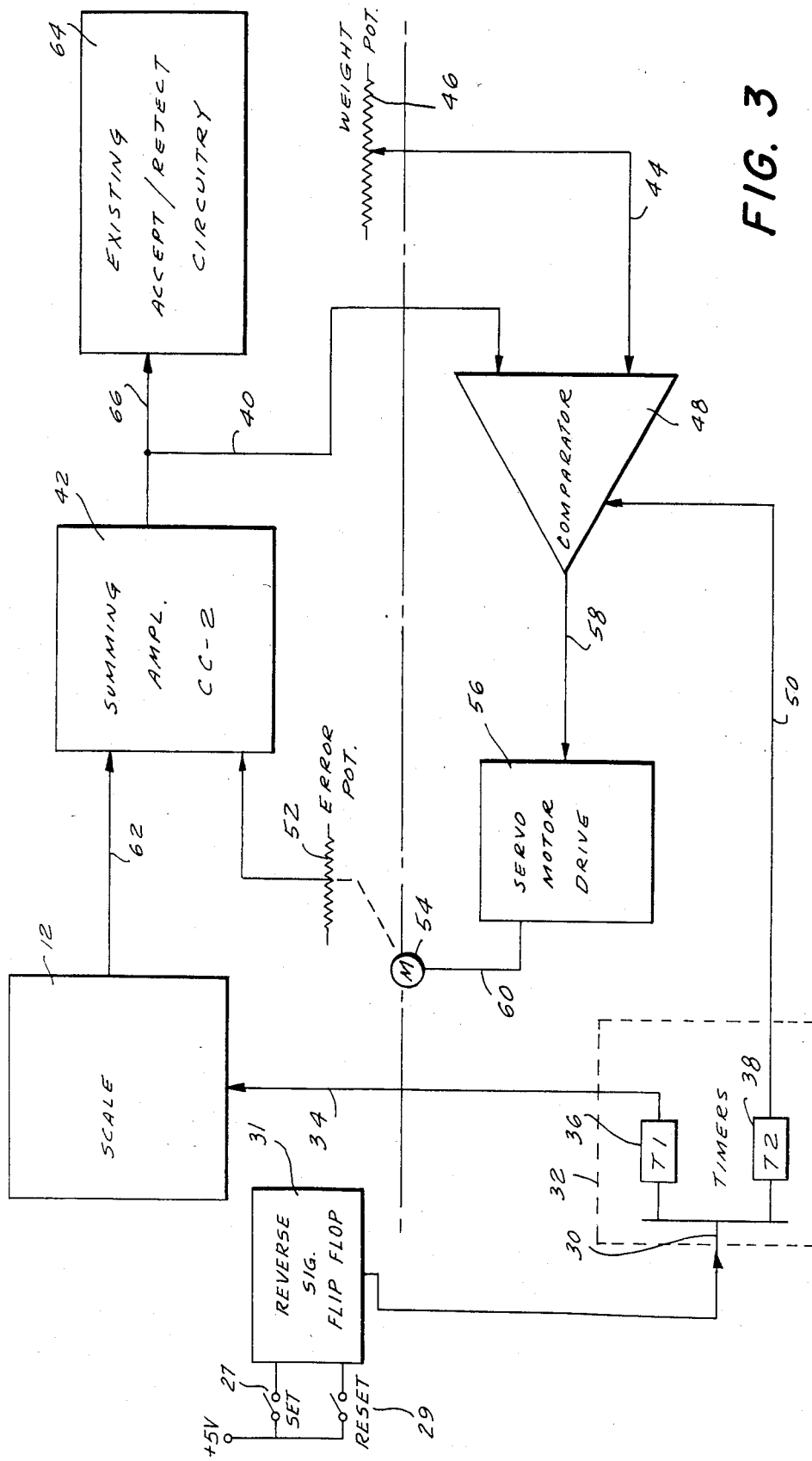
FIG. 3 is a block diagram of the apparatus of FIGS. 1 and 2 with a tare correction system as part of the apparatus.

In the drawings, a stacker 10 is supported by scale 12 shown at the discharge end of a slicing machine 14. The sliced product discharge on the stacker 10 is deposited as a stack on the conveyor 16 and then eventually to a packaging station (not shown). In accordance with U.S. Pat. Nos. 3,905,259 and 3,906,823, if a stack registered by the scale 12 is not within the prescribed weight tolerances, it is rejected by reject conveyor 18 and transferred to a station at which the proper weight is manually made.

The slicing machine 14 may be any one of the several different types of slicing machines presently being used in the meat packing industry. In accordance with a successful embodiment of the invention, the slicing machine 14 may be of the type disclosed in the above referenced patents and which is available commercially under the name Anco, No. 832, Cold Cut Slicer, manufactured by the Allbright-Nell Co. of Chicago, Ill. In a slicing machine of this type, a feeder 20 shifts forwardly thereby pushing the loaf 22 of the selected cold cut into the slicing blade 24. A sliced thickness control 26 is coupled with the feeder 20 to increase or decrease the rate of travel of the feeder 20 and consequently increase and decrease the slice thickness, respectively. The control 26 may be automatically adjusted in response to feedback signal from the scale 12.

A stacker 10 is driven in timed relationship with the rotation of the shaft of blade 24 and receives slices of the product 22, collects them in a stack on paddles 28, and after the blade has cut the last slice, deposits the stack on the conveyor 16. As disclosed in the above referenced U.S. Pat. No. 3,204,676, the stacker 10 may be obtained commercially under the name Anco, No. 834, Slice-Stacker, manufactured by the Allbright-Nell Co., of Chicago, Ill. It is possible for the stacker 10 to be actuated by scale 12.

The stacker 10 is mounted on and supported by a scale 12 in order that the stack weight on the stacker paddles 28 will be transferred to the scale. The scale may be of the type disclosed in the above referenced patents and it should be noted that it may be one where the stacker is not attached to the scale but rather the stacker places complete stacks of product onto a conveyor which is attached to the scale. The weighing-while-conveying apparatus is disclosed, for example, in the above referenced U.S. Pat. No. 3,099,304, 3,200,864 and 3,204,676, and may readily be incorporated in the system. Also, a number of commercially available scales may be employed, i.e., a scale may be obtained commercially from the manufacturer, Wright Machinery Co., a division of Sperry-Rand Corporation of Durham, N.C. under the name of Wrightronic Checkweigher.

The conveyor 16 is conveniently located to receive the stacks of sliced products that are deposited upon the actuation of the stacker 10. The conveyor 16 is constantly driven by a motor (not shown) which may be of the type disclosed in the above referenced U.S. Pat. No. 3,200,864, which travels at a low speed during the depositing of the sliced stack thereon by the stacker 10 and at an increased speed in order to remove the stacks therefrom in a minimum period of time.

The conveyor 18 will receive the stacks from the conveyor 16 and transfer them to the packaging station (not shown). In the event conveyor 18 is of the stack rejecting type which is actuated upon receipt of signals from the scale 12 when a stack weight is registered outside of the prescribed tolerances, a reject conveyor of the type disclosed in the above referenced U.S. Pat. No. 3,200,864 may be employed. This type of conveyor operates to divert an overweight or underweight stack in order that the proper weight may be made.

As disclosed in U.S. Pat. Nos. 3,906,823, 3,905,259, and 3,835,742 the scale 12 is adapted to actuate the stacker when the preset weight is registered for the stack of slices being accumulated on the blades. In other words, the slice thickness control is initially adjusted for the desired slice thickness, and the ultimately formed stack of slices having this weight will be formed independently of any slice count. The weight of the stack being formed is sensed by the scale 12 which sends electrical signals to a comparator of well known circuitry. The comparator is preset or adjusted by a signal established by the standard corresponding to the desired selected weight of the stack of slices to be formed. When the comparator receives a signal from the scale corresponding to that established by the standard, the comparator will operate to actuate the stacker 10. Representative circuitry and means for the comparator and standard are disclosed in the above referenced U.S. Pat. Nos. 3,200,864 and 3,204,676 in connection with the slice thickness control. Thus stacks are formed within the prescribed weight tolerance.

Also, in accordance with Pat. Nos. 3,906,823, 3,905,259 and 3,835,742 the stacker 10 may be actuated after a predetermined count in the manner disclosed in the above U.S. Pat. No. 3,204,676. Accordingly, an operative interconnection is provided between scale 12 which supports the stacker and the slice thickness control. In this manner, the speed of the feed of the loaf into the slicing blade by the feeder is automatically regulated to change slice thickness and thereby maintain the weight of the stacked slices within desired limits. As disclosed in that patent, a counter cooperates in determining the number of slices to be collected on and deposited by the stacker paddles. This counter is actuated in timed relationship with respect to the rotation of the slicer blade shaft and, in turn, applies its output through a flexible drive shaft to the stacker 10. The count at which the stacker 10 is actuated to shift the paddles is adjustable. Today, it is common to utilize an eight slice stack for one-half pound cold cut packages and a sixteen slice stack for a one pound package.

Also in accordance with U.S. Pat. Nos. 3,906,823, 3,905,259, 3,835,742, a similar system can be utilized where the scale 10 weighs the stack after a prescribed count less the number of slices to be contained in the ultimately formed stack instead of adjusting slice thickness after weighing the entire stack of slices. For example, the scale may register the weight at $n-3$, n being the number of slices to be counted in the ultimately formed stack. The count is taken from the slicing blade shaft by a counter which operates to actuate the stacker 10 in a manner similar to that disclosed in the above referenced U.S. Pat. No. 3,204,676. Thus, the stacker 10 receives slices from the discharge end of the slicing machine 14. At $n-3$ slices, the scale 12 registers weight and transmits this weight signal to a comparator which compares this signal with a preset standard for the proper weight of $n-3$ slices. If this weight is outside of the preset tolerance, then the speed of feed of the feeder is correspondingly changed through the adjustment of a slice thickness control. Under these circumstances, the last three slices of the stack being formed will have introduced a thickness adjustment which will bring the stack within the proper weight. Of course, when the prescribed count indicating the desired number of slices in the ultimately formed stack has been reached, the counter actuates the stacker to permit this stack of proper weight to be transferred to the packaging station.

Furthermore as set forth in Pat. Nos. 3,835,742, 3,906,823 and 3,905,259 it is also possible to provide as part of the system an arrangement whereby the stack weight is sensed by the scale 12 at the end of every three slices being deposited in stack form on the stacker while assuming a desired 16 slice, 1 pound package. Accordingly, after three slices have been deposited on the stacker after the initiation of the formation of a new stack, the weight registered by scale 12 is compared by a comparator with the standard weight for three slices of the product being sliced as established by the three slices standard. If the actual weight of the three slices does not fall within the tolerances established by the three slice standard, a signal is sent to a sliced thickness control to adjust the rate of feed of the feeder to thereby alter the slice thickness by a proportionate amount in order that the remaining slices of the stack being formed may have an adjusted or corrected thickness. The same sequence is repeated at six slice, nine slice, and twelve slice intervals. In accordance with standard practice when the selected stack count is taken from the slicer blade shaft by the counter, the stacker is actuated in order that this stack may be transferred to the packaging station. Where desired or necessary, the scale may sense the weight of slices accumulated on the stacker at more frequent intervals.

The scale may also register or sense the weight of the stack having the ultimate and desired number of slices. Should, for any reason, this stack not be within the prescribed weight tolerance, a reject mechanism may divert this stack in a manner disclosed in the above referenced U.S. Pat. No. 3,200,864. An attendant or operator will then bring the stack within the limits of proper weight.

Figure 5:
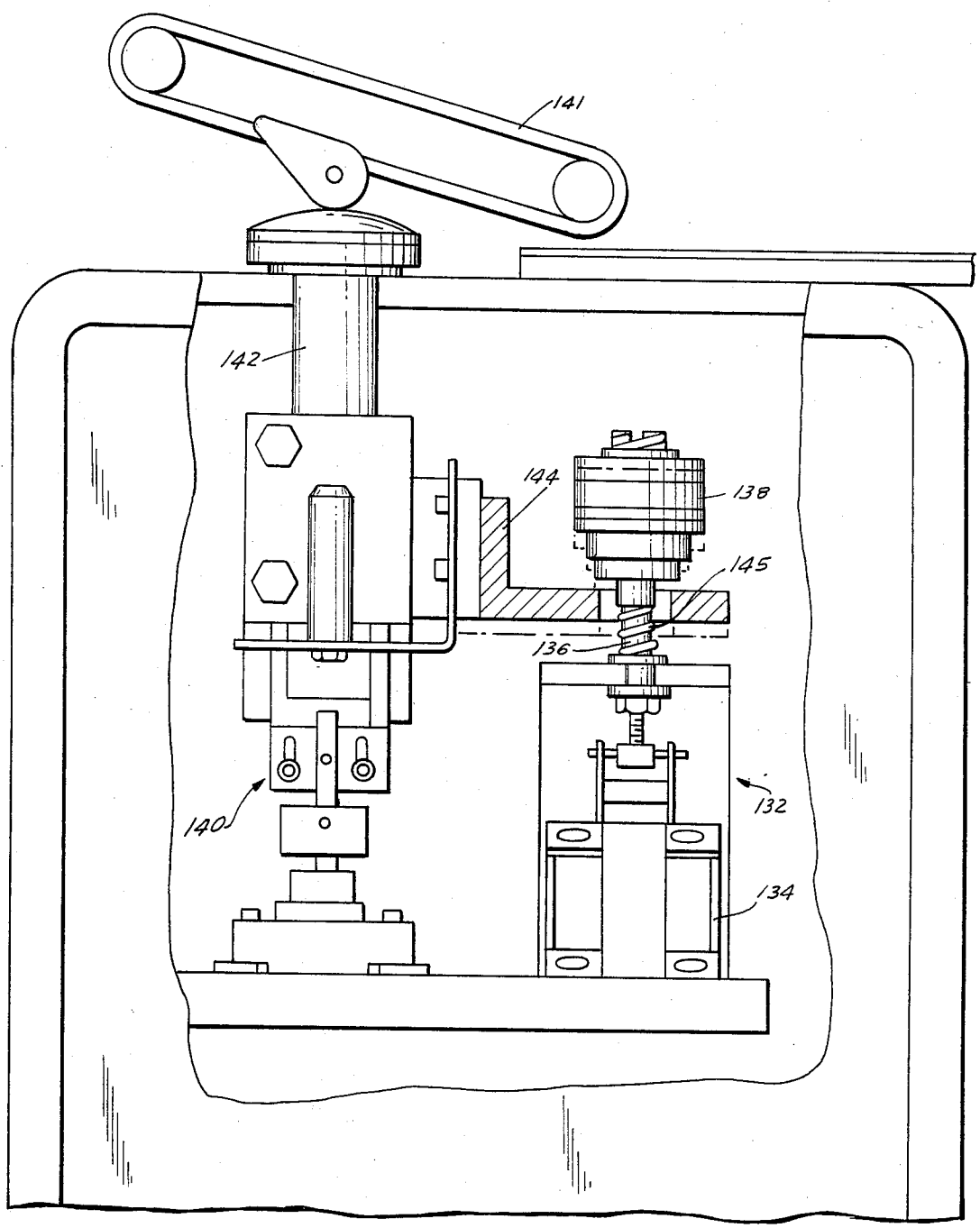
FIG. 5 is a partial side elevational view of the solenoid mechanism and weighing apparatus which is part of the tare correction system.

In the present invention, a tare correction system 11 is provided as schematically depicted in FIG. 3 and can be located in the scale cabinet as shown in FIG. 5. The tare correction system automatically zeros in the weighing mechanism to compensate for loss or gain of scrap on the weight head conveyor.

The role of the tare correction system would be to adjust the weight potentiometer (reference voltage) or scale null so that it would reflect an accurate signal with regard to the weight. It is not connected in any other fashion to the slicing and weighing apparatus aside from being activated via limit switches hereinafter discussed. Nor is it connected in any other manner with the slice thickness control except that by adjusting the reference voltage or scale noll, it influences the slice thickness control since the reference is utilized by the weighing system in error determination.

For example, the weight pot is initially set to accurately reflect the weight on the scale. After a period of slicing and stacking operating, material or scraps weight builds up on the scale. If perhaps this amounted to 1 ounce, then during weighing, the scale would be indicating the correct weight for a stack that was 1 ounce under weight. What the tare correction system would do is adjust the weight pot or scale noll to take this excess ounce into account so that during weighing the correct weight would be realized. In addition, the system may advantageously function during the return of the carriage so as not to interfer with the slicing and weighing procedure.

When the carriage actuates the forward limit switch there is a short time delay, then the automatic tare correction apparatus is energized, and basically involves dropping the weights onto the scale weight platform. The tare correction system operates automatically in dropping the weight on the scale each time the carriage is in the return cycle, as aforementioned, may be accomplished possibly by the solenoid mechanism shown in FIG. 5. While the carriage is returning, the scale will reset itself. The point to where it resets depends upon the weight on the scale and the setting of an operator-controlled weight dial on the front of the weight control structure. Therefore, the build-up of meat scraps or grease on the weigh head conveyor does not affect the weight of the stack since this is taken into account on each return cyckle.

The automatic tare may be manually operated by depressing a tare enable switch on the apparatus. The automatic tare system is also enabled when the slicer is in the hold mode.

If the automatic tare pot is out of range (pot at either end of travel), an automatic tare system alarm will signal whenever the tare correction system is enabled, indicating that no correction is being made. When this occurs, the unit is renulled, unless a severe scrap build-up is found to be the cause.

Initially, the operator selects the weight that is required. The appropriate tare weights are then positioned on the apparatus for the chosen weight. This is shown to involve a solenoid apparatus 132 located in the scale cabinet which is activated and deactivated via forward and rear limit switches 27 and 29 respectively, hereinafter described and shown in FIG. 3. The solenoid apparatus includes a solenoid 134 which is connected to a scale weight pivot stud 136 on which is placed the desired amount of weights 138. In the case of one pound packages, this would be approximately 16 ounces which may be a single unit weight or a cummulation of individual weights which may be removed as desired. A scale mechanism 140 is provided which would connect to the stacker 10 or as shown to a conveyor 141 via shaft 142. A scale bracket 144 is connected to the scale and is in a position to receive the weights, which are shown off the scale bracket due to spring 145, which would maintain the weights off the scale when the solenoid is deenergized. When the solenoid is energized, the weights are lowered onto the scale bracket (shown in phantom) in a free floating manner thereon, providing a control weight for comparison and scale adjustment.

In FIG. 3, a circuitry outline is shown, and when the carriage travels forward tripping the forward limit switch 27, it signifies the end of a slicing sequence and activates the tare correction sequence with the carriage reverse signal 30 via flip flop 31. This activates timers 32. Approximately 1 second later (t−1) by a signal 34 from timer 36, the known reference weight 138, is automatically lowered onto the scale bracket 144, by the solenoid apparatus 132.

After allowing another second (t−2) as controlled by a timer 38, for the scale to settle, a weight reading is taken at the output 40 of the CC-2 card of the summing amplifier 42 and compared with the reference voltage 44 from the weight pot 46 in comparator 48. Timer 38 communicates with comparator 48 through line 50 for this purpose.

Any difference between the two voltages is an error in the weight signal, i.e., due to scrap on the scale. This error is detected in comparator 48 and actuates the error pot 52 driven by motor 54 through servo motor drive 56. The comparator is connected through line 60 to motor 54 for this purpose. The error pot 52 is driven in the direction to cancel (null) out the error.

Just as the front limit switch 27 sets the flip flop 31 and provides a signal 30 enabling the automatic tare correction system, similarly, when the carriage has fully returned, it trips the rear limit switch 29, resetting the tare correction system by resetting the flip-flop 31 which in turn would isolate the tare correction circuit, disabling it from the system. This in turn deenergizes the solenoid 134 which causes the lifting of the weight off the scale, by the spring 145 to allow for slicing and weighing operation.

The conventional weighing system components utilized and as depicted in FIG. 3, and as discussed in the above referenced patents, include scale 12 communicating with amplifier 42 through line 62 and the amplifier 42 which communicates with known accept/reject circuitry 64 through line 66.

Figure 4:
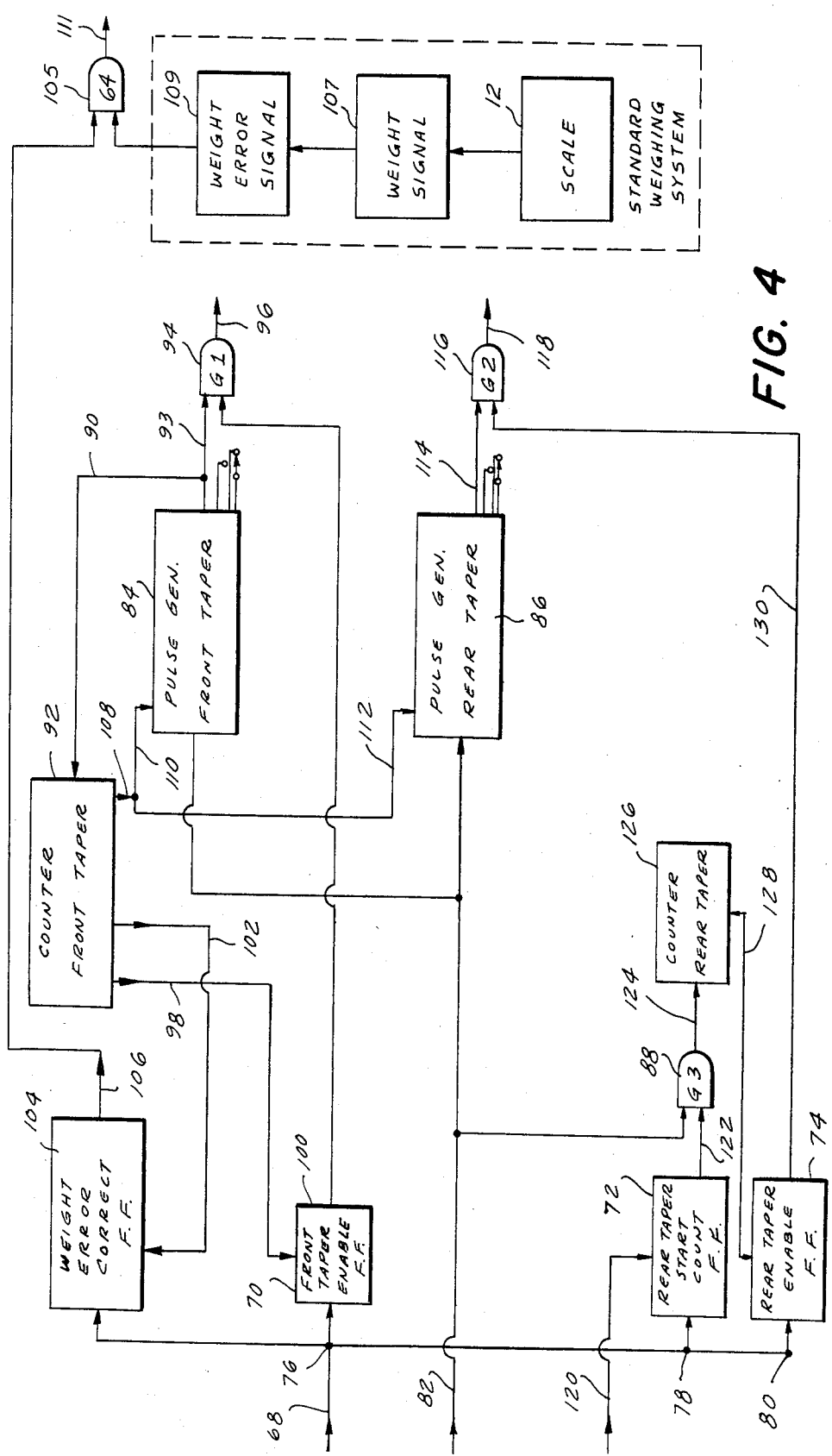
FIG. 4 is a block diagram of the apparatus of FIGS. 1 and 2 incorporating a profile compensation control system as part of the apparatus.

The profile compensation system 15 or taper control system as depicted in FIG. 4 is for utilization by the operator to maintain better weights with fewer rejects at the front and rear ends of the loaf. All loaves, round or square, have some degree of taper, both front and rear. The automatic or weight error signal of the type eminating from the standard weighing system as described in the above referenced patent are not designed to anticipate this change in the diameter of the product. The profile compensation system 15, is meant to supplement this standard system by providing an automatic error signal to adjust the product feed at the beginning and end of the loaf. An outline of the standard weighing system is shown in FIG. 4 and includes the scale 12 and would provide a weight signal 107 for product being sliced, which if in error, would provide an automatic error signal 109 so that it may be utilized in slice thickness adjustment. Such a system is standardly employed and representative circuitry for such is disclosed in the above referenced U.S. patents. This would provide an error signal 109 which would normally connect to a product feed servo, or motor via line 111 which can, for example, and as commonly utilized, adjust a potentiometer coupled with a product feed motor so as to increase or decrease the feed of the product according to the error signal. For example, if the error signal reflected a light weight, the product feed would be increased so as to thicken the slice, increasing the stack weight. The opposite would apply if an overweight error signal existed.

Accordingly, while slicing the front portion of the loaf, the automatic error signal will correct to make the slice heavier. Slicing up the taper to the proper diameter increases weight by itself and the resultant weight pattern would follow a sequence of one or two rejects due to light weight, than one or two accepts due to the correct weight, and then one or two rejects due to heavy weight.

Thereafter the weight pattern settles down through the center of the loaf giving correct weights until the rear taper is reached. At this point the automatic error signal senses the stack becoming lighter due to decrease in diameter of the product, however, sometimes the automatic error signal does not have the ability to give sufficient correction to overcome this downward taper which will result in several light weight stacks. Profile correction system 15 minimizes these front and rear problems with more consistent weights throughout the loaf and fewer rejects.

Appropriate controls are placed on the apparatus for the operator to use in connection with the front end of the loaf and for the rear end of the loaf. It is been found that two, three-position controls, one for the front and one for the rear will operate satisfactorily. The three positions for the front end control would be zero, medium, and heavy. At the zero position no taper correction is made at the front of the loaf. Only a conventional normal automatic error signal is present. This setting is used on a very uniform square loaf. At the medium setting, the control automatically decreases the weight at the front end of the loaf, while the conventional automatic error signal is calling for heavier weights. This prevents the system from overshooting, resulting in heavy rejects at the front of the loaf. The medium setting is used on products having a medium taper. The third setting is the heavy setting and when set in this position, the front taper control gives a greater downward correction. The heavy setting is used on a product with a heavy front taper.

The rear three position control also has zero, medium, and heavy settings. At the zero position, no taper control is used on the rear of the loaf. There is only the conventional automatic error signal correction. Once again this is used on a uniform square loaf. At the medium setting, the taper control gives an additional upward correction assisting the conventional automatic error signal to overcome the taper at the rear end of the product. This setting is used with a product having a medium taper. At the heavy setting, there is a greater upward correction. It is used on a product having an extreme taper.

The front and rear controls operate independently of each other. The front may be set on heavy and the rear on medium or vice versa. The proper settings are the ones that give best results for both the front and rear of the particular product that is being sliced.

The operation is depicted in FIG. 4, the rear limit switch 29 is activated by the returning product feed carriage signals a reset through line 68 of the taper control circuits 70, 72 and 74 at reset points 76, 78 and 80 respectively. This is in addition to the rear limit switch's 29 function in the tare operation.

Thereafter slicing starts. Stacks of products are dropped on the scale 12, generating counting pulses.

These pulse signals, from the scale, as the product is dropped thereon, is a feature standard to the weighing scales presently being used. (See for example U.S. Pat. Nos. 3,200,864 and 3,204,676). The pulses are fed through line 82, and are routed to the pulse generator for the front taper 84, the pulse generator for the rear taper 86 and gate (G-3) 88. The rear taper pulse generator 86 and gate (G-3) 88 are inhibited at this time and do nothing with the count pulses.

The front taper pulse generator 84 generates correction pulses which are directed through line 90 to be counted by the front taper counter 92. Through line 93 the pulses are inhibited by gate (G-1) 94 from going to the product feed servo through line 96 until the counter reaches the present count, (1 or 2) for example, for "start front taper" through connection 98. The interconnection of line 96 with the product feed servo could be the same as line 111 aforementioned with regard to the standard weight error signal 109 adjusting the feed of the product via a potentiometer arrangement.

When counter 92 does reach the preset count for "start front taper" through line 98, it sets the front taper enable flip-flop 100, which enables gate (G-1) 94, and allows correction pulses which vary depending on operator selection, i.e. medium, heavy taper etc., to be routed to the product feed servo through line 96 thereby decreasing the stack weight.

Counter 92 continues to count and reaches preset count, (2 or 3) for example, for "start weight error correction" and signals this through line 102. As aforementioned, weight error correction is standard as indicated in the above referenced patents for all cold cut systems of the present type whether or not there is a taper correction control. All stacks sliced during the remainder of the slicing cycle will have the weight error correction signal applied. This is accomplished by weight error correction flip-flop 104 which enables gate (G-4) 105 via line 106. This enables weight error correction by allowing the weight error signal 109 to adjust the product feed servo as of forementioned via line 111. Prior to this time, the standard weight error correction was inhibited by gate 105.

When counter 92 reaches the preset count, (4 or 5) for example, for "stop front taper", through line 108 this causes the following to occur. The front taper pulse generator 84 through line 110 is inhibited from generating any additional correction pulses. Also, the rear taper pulse generator 86 is enabled through line 112 and generates correction pulses through line 114. These pulses are inhibited by gate (G-2) 116, from going to the product feed servo through line 118. The connection between line 118 and the product feed servo can be the same as that aforementioned with regard to line 96 and 111.

Slicing of the product continues with the standard weight error correction applied to the product feed servo through line 111 to control the weight.

When there is approximately 24 inches of product remaining to be sliced, for example, the rear taper switch (not shown) is activated and through line 120 it sets the rear taper start count flip-flop 72, which enables gate (G-3) 88 through line 122 which in turn through line 124 allows count pulses into the rear taper counter 126. This rear taper switch, may be located on the slicing machine and activated either due to the passing of the tail end of the loaf or the carriage. Any standard switch may be utilized and in the example, it could be located approximately 24 inches from the blade so as to indicate 24 inches of products left to be sliced.

When counter 126 reaches the present count, (2 to 6) for example, for "start rear taper", through line 128 it sets the rear taper enable flip-flop 74. Through line 130 this enables gate (G-2) 116, allowing correction pulses, also depending on operator selection, to be routed through connection 118 to the product feed servo thereby increasing the weight of a stack.

Both the weight error correction through line 111 and the rear taper correction pulses through line 118 are applied to each stack until the forward limit switch is energized and slicing stops.

The product feed carriage returns, actuating the rear limit switch 29 and starting the sequence again.

The tare correction system of FIG. 3 and the taper control system of FIG. 4 of the present apparatus are supplements to standard weighing systems as described in the above referenced patents and help in maintaining more uniform weights with fewer rejected stacks. The tare correction system is in operation at all times and the taper control system operates at the operator's discretion.

Thus the several aforenoted objects and advantages are most effectively attained. Although several preferred embodiments have been disclosed and described in detail herein, it should be understood that this invention is in no sense limited thereby and its scope is to be determined by that of the appended claims.

What is claimed is:

1. In combination a slicing machine having a slicing blade, a feeding means for feeding a product to be sliced into said blade and control means for determining the rate of advance of said feeding means toward said blade, apparatus for stacking slices of said product as they are discharged by said slicing machine and then transferring the stacks of sliced product, weighing means operatively supporting said stacker such that it is adapted to register the weight of the sliced product being stacked thereon, stacker actuating means coupled with said stacker to transfer the stack of slices of said product and ready said stacker for reception of another stack of slices, slice counting means for determining a preselected number of slices discharged from the slicing machine for stacking on the stacker, stack receiving means and conveying means in stack receiving position adjacent said stacker and being adapted to receive thereon the stacks of sliced products transferred by said stacker, and tare correction control means associated with said weighing means to automatically operate in adjusting the weighing means to account for tare weight thereby facilitating the production of more uniform weight of stacks of sliced product, said tare correction control means includes: standard weight means for automatically dropping a standard weight on the scale each time the feeding means is being returned to the initial start position and is not feeding product into the blade; activation means for signaling the end of a slicing sequence and initiating the tare correction sequence; timing means indicating when the weighing means is cleared of the last stack and initiating the lowering of the standard weight onto the weighing means; second timing means for initiating the taking of a weight reading after a predetermined time delay and initiation of comparator means to compare the weight reading with a reference weight reading, upon detection of an error occurring from a difference in the two weight readings, the comparator actuates means for adjusting the weighing means to cancel out the error; and deactivation means responsive to full return of the feeding means to the initial position to disable the tare correction system and reset the slicing machine for the slicing and weighing operation.

2. In combination a slicing machine having a slicing blade, a feeding means for feeding a product having at least one tapered portion to be sliced into said blade and control means for determining the rate of advance of said feeding means toward said blade, apparatus for stacking slices of said product as they are discharged by said slicing machine and then transferring the stacks of sliced product, weighing means operatively supporting said stacker such that it is adapted to register the weight of the sliced product being stacked thereon, stacker actuating means coupled with said stacker to transfer the stack of slices of said product and ready said stacker for reception of another stack of slices, slice counting means for determining a preselected number of slices discharged from the slicing machine for stacking on the stacker, stack receiving means and conveying means in stack receiving position adjacent said stacker and being adapted to receive thereon the stack of sliced product transferred by said stacker, and profile compensation means on said slicing machine responsive to a preselected number of slices as indicated by the sliced counting means to adjust the feeding means and accordingly the weight of the stacks.

3. The invention in accordance with claim 2 wherein the profile compensation means includes a front taper control means and a rear taper control means with the front taper control means activating means to adjust the feeding means to decrease the weight and the rear taper control means activating means to adjust the feeding means to increase the stacked weight.

4. The invention in accordance with claim 3 wherein start weight error correction means is provided in addition to the profile compensation means to adjust the feeding means for weight correction.

5. The invention in accordance with claim 4 wherein taper control activation means is on the machine for activating the profile compensation controls upon the return of the feeding means to the initial start position, a front taper pulse generator responsive to the counting means and upon a preselected count generates correction pulses through servo means to the feeding means to adjust the rate of feed and thereby decrease the stacked weight, start weight error correction means responsive to a preselected count number from the slice counting means to adjust the rate of feed of the feeding means, stop front taper means responsive to a preselected count number from the slice counting means to inhibit the front taper pulse generator and for enabling rear taper pulse generator to generate correction pulses means for inhibiting the correction pulses from the rear taper pulse generator until a preselected number of slices is counted by the counting means whereupon correction pulses from the rear taper pulse generator are fed to the servo means which adjusts the rate of feed of the feeding means thereby increasing the stacked weight, the start weight error correction pulses and the rear taper correction pulses continuing until stopped by stop means at the end of the feed path of the feeding means.

6. In combination a slicing machine having a slicing blade, a feeding means for feeding a product to be sliced into said blade and control means for determining the rate of advance of said feeding means toward said blade, apparatus for stacking slices of said product as they are discharged by said slicing machine and then transferring the stacks of sliced product, weighing means operatively supporting said stacker such that it is adapted to register the weight of the sliced product being stacked thereon, stacker actuating means coupled with said stacker to transfer the stack of slices of said product and ready said stacker for reception of another stack of slices, slice counting means for determining a preselected number of slices discharged from the slicing machine for stacking on the stacker, stack receiving means and conveying means in stack receiving position adjacent said stacker and being adapted to receive thereon the stacks of sliced product transferred by said stacker, and tare correction control means associated with said weighing means to automatically operate in adjusting the weighing means to account for tare weight thereby facilitating the production of more uniform weight of stacks of sliced products, said tare correction control means includes activation means for signaling the end of a slicing sequence and initiating the tare correction sequence, timing means indicating when the weighing means is cleared of the last stack and initiating the lowering of a standard weight onto the weighing means, second timing means for initiating the taking of a weight reading after a predetermined time delay and initiation of comparator means to compare the weight reading with a reference weight reading, upon detection of an error occurring from a difference in the two weight readings, the comparator actuates a means for adjusting the weighing means to cancel out the error, and deactivation means responsive to full return of the feeding means to the initial position to disable the tare correction system and reset the slicing machine for the slicing and weighing operation, and profile compensation means on said slicing machine for adjusting the feeding means and accordingly the weight of the sliced product for a product having at least one tapered portion.

7. In combination a slicing machine having a slicing blade, a feeding means for feeding a product having at least one taper portion to be sliced into said blade and control means for determining the rate of advance of said feeding means toward said blade, apparatus for stacking slices of said product as they are discharged by said slicing machine and then transferring the stacks of sliced product, weighing means operatively supporting said stacker such that it is adapted to register the weight of the sliced product being stacked thereon, stacker actuating means coupled with said stacker to transfer the stack of slices of said product and ready said stacker for reception of another stack of slices, slice counting means for determining a preselected number of slices discharged from the slicing machine for stacking on the stacker, stack receiving means and conveying means in stack receiving position adjacent said stacker and being adapted to receive thereon the stacks of sliced product transferred by said stacker, and tare correction control means associated with said weighing means to automatically operate in adjusting the weighing means to account for tare weight thereby facilitating the production of more uniform weight of stacks of sliced products, and profile compensation means on said slicing machine responsive to a preselected number of slices as indicated by the slice counting means to adjust the feeding means and accordingly the weight of the stacks.

8. In combination a slicing machine having a slicing blade, a feeding means for feeding a product having at least one tapered portion to be sliced into said blade and control means for determining the rate of advance of said feeding means toward said blade, apparatus for stacking slices of said product as they are discharged by said slicing machine and then transferring the stacks of sliced product, weighing means operatively supporting said stacker such that it is adapted to register the weight of the sliced product being stacked thereon, stacker actuating means coupled with said stacker to transfer the stack of slices of said product and ready said stacker for reception of another stack of slices, slice counting means for determining a preselected number of slices discharged from the slicing machine for stacking on the stacker, stack receiving means and conveying means in stack receiving position adjacent said stacker and being adapted to receive thereon the stacks of sliced product transferred by said stacker, and tare correction control means associated with said weighing means to automatically operate in adjusting the weighing means to account for tare weight thereby facilitating the production of more uniform weight of stacks of sliced products, and profile compensation means on said slicing machine for adjusting the feeding means and accordingly the weight of the sliced product, said profile compensation means includes a front taper control means and a rear taper control means with the front taper control means activating means to adjust the feeding means to decrease the weight and the rear taper control means activating means to adjust the feeding means to increase the stacked weight.

9. In combination a slicing machine having a slicing blade, a feeding means for feeding a product to be sliced into said blade and control means for determining the rate of advance of said feeding means toward said blade, apparatus for stacking slices of said product as they are discharged by said slicing machine and then transferring the stacks of sliced product, weighing means operatively supporting said stacker such that it is adapted to register the weight of the sliced product being stacked thereon, stacker actuating means coupled with said stacker to transfer the stack of slices of said product and ready said stacker for reception of another stack of slices, slice counting means for determining a preselected number of slices discharged from the slicing machine for stacking on the stacker, stack receiving means and conveying means in stack receiving position adjacent said stacker and being adapted to receive thereon the stacks of sliced product transferred by said stacker, and tare correction control means associated with said weighing means to automatically operate in adjusting the weighing means to account for tare weight thereby facilitating the production of more uniform weight of stacks of sliced products, and profile compensation means on said slicing machine for adjusting the feeding means and accordingly the weight of the sliced product for a product having at least one tapered portion, and start weight error correction means is provided in addition to the profile compensation means to adjust the feeding means for weight correction.

10. In combination a slicing machine having a slicing blade, a feeding means for feeding a product having at least one tapered portion to be sliced into said blade and control means for determining the rate of advance of said feeding means toward said blade, apparatus for stacking slices of said product as they are discharged by said slicing machine and then transferring the stacks of sliced product, weighing means operatively supporting said stacker such that it is adapted to register the weight of the sliced product being stacked thereon, stacker actuating means coupled with said stacker to transfer the stack of slices of said product and ready said stacker for reception of another stack of slices, slice counting means for determining a preselected number of slices discharged from the slicing machine for stacking on the stacker, stack receiving means and conveying means in stack receiving position adjacent said stacker and being adapted to receive thereon the stacks of sliced product transferred by said stacker, and tare correction control means associated with said weighing means to automatically operate in adjusting the weighing means to account for tare weight thereby facilitating the production of more uniform weight of stacks of sliced products, and profile compensation means on said slicing machine for adjusting the feeding means and accordingly the weight of the sliced product, and tapered control activation means being on the machine for activating the profile compensation means upon the return of the feeding means to the initial start position, a front taper pulse generator responsive to the counting means and upon a preselected count generates correction pulses through servo means to the feeding means to adjust the rate of feed and thereby decrease the stacked weight, start weight error correction means responsive to a preselected count number from the slice counting means to adjust the rate of feed of the feeding means, stop front taper means responsive to a preselected count number from a slice counting means to inhibit the front taper pulse generator and for enabling rear taper pulse generator to generate correction pulses means for inhibiting the correction pulses from the rear taper pulse generator until a preselected number of slices is counted by the counting means whereupon correction pulses from the rear taper pulse generator are fed to the servo means which adjusts the rate of feed of the feeding means thereby increasing the stacked weight, the start weight error correction pulses and the rear taper correction pulses continuing until stopped by stop means at the end of the feed path of the feeding means.

* * * * *